(12) United States Patent
Wang et al.

(10) Patent No.: US 12,519,670 B2
(45) Date of Patent: Jan. 6, 2026

(54) TRANSMISSION IN A WIRELESS COMMUNICATION NETWORK

(71) Applicant: Telefonaktiebolaget LM Ericsson (publ), Stockholm (SE)

(72) Inventors: Min Wang, Luleå (SE); Jan Christoffersson, Luleå (SE); Mårten Ericson, Gammelstad (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 624 days.

(21) Appl. No.: 17/995,304

(22) PCT Filed: Apr. 3, 2020

(86) PCT No.: PCT/SE2020/050354
§ 371 (c)(1),
(2) Date: Sep. 30, 2022

(87) PCT Pub. No.: WO2021/201736
PCT Pub. Date: Oct. 7, 2021

(65) Prior Publication Data
US 2023/0163985 A1     May 25, 2023

(51) Int. Cl.
*H04M 1/66* (2006.01)
*H04L 12/14* (2006.01)
(Continued)

(52) U.S. Cl.
CPC ........... *H04L 12/141* (2013.01); *H04W 76/14* (2018.02); *H04W 76/15* (2018.02)

(58) Field of Classification Search
CPC ...... H04L 12/141; H04L 12/14; H04W 76/15; H04W 76/14
(Continued)

(56) References Cited

U.S. PATENT DOCUMENTS

| 9,924,460 B2* | 3/2018 | Walldeen | H04W 48/10 |
| 11,711,799 B2* | 7/2023 | Shrader | H04W 76/14 |
| | | | 370/329 |

(Continued)

FOREIGN PATENT DOCUMENTS

| CN | 105981309 A | 9/2016 |
| CN | 105992184 A | 10/2016 |

(Continued)

OTHER PUBLICATIONS

EPO Communication with Supplementary European Search Report dated Apr. 26, 2023 for Patent Application 20928214.4, consisting of 4-pages.

(Continued)

*Primary Examiner* — Marceau Milord
(74) *Attorney, Agent, or Firm* — Weisberg I.P. Law, P.A.

(57) ABSTRACT

Methods and devices for supporting charging relating to a group transmission in a wireless communication network. The group transmission involving a group of wireless devices configured to, via one or more direct communication links between each other, participate in transmission of user data between a source wireless device and the network. It is obtained, for each one of wireless devices of the group, a data amount indicator indicating how much data the wireless device has been involved in transmitting as part of the group transmission. It is provided one or more reports based on the obtained data amount indicators to one or more core network nodes.

15 Claims, 7 Drawing Sheets

(51) Int. Cl.
*H04M 1/68* (2006.01)
*H04M 3/16* (2006.01)
*H04W 76/14* (2018.01)
*H04W 76/15* (2018.01)

(58) Field of Classification Search
USPC .................................. 455/405, 343.1, 343.2
See application file for complete search history.

(56) References Cited

U.S. PATENT DOCUMENTS

| | | | | |
|---|---|---|---|---|
| 12,137,499 | B2 * | 11/2024 | Cha | G06F 1/1637 |
| 2011/0314145 | A1 * | 12/2011 | Raleigh | H04L 63/08 |
| | | | | 709/224 |
| 2013/0148526 | A1 | 6/2013 | Hwang et al. | |
| 2013/0295986 | A1 * | 11/2013 | Mueck | H04W 48/18 |
| | | | | 455/552.1 |
| 2013/0316681 | A1 * | 11/2013 | Huang | H04M 15/93 |
| | | | | 455/414.1 |
| 2014/0126446 | A1 * | 5/2014 | Deivasigamani | ............... |
| | | | | H04W 52/0216 |
| | | | | 370/311 |
| 2015/0326738 | A1 | 11/2015 | Li et al. | |
| 2016/0261757 | A1 * | 9/2016 | Rajadurai | H04M 15/00 |
| 2016/0345261 | A1 * | 11/2016 | Walldeen | H04W 52/0212 |
| 2017/0171724 | A1 * | 6/2017 | Kazmi | H04W 76/10 |
| 2017/0347338 | A1 | 11/2017 | Chen et al. | |
| 2020/0059777 | A1 | 2/2020 | Drevo et al. | |
| 2021/0092755 | A1 * | 3/2021 | Shrader | H04W 72/1268 |
| 2021/0377746 | A1 | 12/2021 | Zarifi et al. | |
| 2022/0174644 | A1 * | 6/2022 | Shi | H04W 68/02 |

FOREIGN PATENT DOCUMENTS

| | | | | |
|---|---|---|---|---|
| CN | 103974219 | B | | 8/2019 |
| EP | 3226583 | A1 | | 10/2017 |
| KR | 10-2016-0078976 | A | | 7/2016 |
| WO | 2017182068 | A1 | | 10/2017 |
| WO | 2019/166031 | A1 | | 9/2019 |
| WO | 2019/210780 | A1 | | 11/2019 |
| WO | WO-2020146854 | A1 * | 7/2020 | H04L 1/1614 |

OTHER PUBLICATIONS

EPO Communication dated May 9, 2023 for Patent Application No. 20928214.4, consisting of 11-pages.
International Preliminary Report on Patentability, PCT App. No. PCT/SE2020/050354, Oct. 13, 2022, 10 pages.
International Search Report and Written Opinion, PCT App. No. PCT/SE2020/050354, Feb. 19, 2021, 13 pages.
W. Elmenreich et al., "Building Blocks of Cooperative Relaying in Wireless Systems," Aug. 14, 2008, pp. 353-359, University of Klagenfurt, Springer Journal 125, Springer.
Sunghoon Jung et al., "A new way of extending network coverage: Relay-assisted D2D communications in 3GPP," 2016, pp. 117-121, ICT Express 2, Elsevier B.V.

* cited by examiner

TRANSMISSION IN A WIRELESS COMMUNICATION NETWORK

CROSS-REFERENCE TO RELATED APPLICATIONS

This application is a National stage of International Application No. PCT/SE2020/050354, filed Apr. 3, 2020, which is hereby incorporated by reference.

TECHNICAL FIELD

Embodiments herein concern a method and arrangements for supporting charging relating to a group transmission in a wireless communication network, said group transmission involving a group of wireless devices configured to, via one or more direct communication links between each other, participate in transmission of user data between a source wireless device and the wireless communication network.

BACKGROUND

Communication devices such as wireless communication devices, that simply may be named wireless devices, may also be known as e.g. user equipments (UEs), mobile terminals, wireless terminals and/or mobile stations. A wireless device is enabled to communicate wirelessly in a wireless communication network, wireless communication system, or radio communication system, e.g. a telecommunication network, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. devices that are not associated with a conventional user.

The wireless device may be, for example, portable, pocket-storable, hand-held, computer-comprised, or vehicle-mounted mobile device, enabled to communicate voice and/or data, via the RAN, with another entity, such as another wireless device or a server.

The wireless communication network may cover a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "Node B", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site may provide radio coverage for one or more cells. A cell is thus typically associated with a geographical area where radio coverage for that cell is provided by the base station at the base station site. Cells may overlap so that several cells cover the same geographical area. By the base station providing or serving a cell is typically meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Special Mobile), which may be referred to as 2nd generation or 2G.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The expression downlink (DL) may generally be used for the transmission path from the wireless communication network, e.g. base station thereof, to the wireless device. The expression uplink (UL) may be used for the transmission path in the opposite direction i.e. from the wireless device to the wireless communication network, e.g. base station thereof.

In 3rd Generation Partnership Project (3GPP) Long Term Evolution (LTE), base stations, which may be referred to as eNodeBs or eNBs, may be directly connected to other base stations and may be directly connected to one or more core networks. LTE may be referred to as 4th generation or 4G.

The 3GPP has undertaken to evolve further the UTRAN and GSM based radio access network technologies, for example into evolved UTRAN (E-UTRAN) used in LTE.

The next generation wide area and high frequency networks may be referred to as NeXt generation (NX), New Radio (NR), or fifth generation (5G).

Device to Device (D2D) communication, i.e. wireless devices also communicating directly with each other without doing it via the network, has been around for some time and be utilized in various ways. For example, 3GPP has specified Proximity Services (ProSe) as a D2D technology that allows wireless devices to detect each other and to communicate directly via a so called Side Link (SL), i.e. a wireless air interface for direct connectivity between devices.

Further, D2D cooperative group communication has been discussed as a way to increase the uplink coverage and user bit rate for example in 5G networks. The basic idea is also known as cooperative relaying or Virtual Antenna Array, se e.g. "*Building Blocks of Cooperative Relaying in Wireless*

*Systems*", W. Elmenreich et. Al, *University of Klagenfurt, Springer Journal* 125, pages 353-359, 2008.

In group transmissions it is utilized direct, i.e. D2D, communication between devices over SLs. The basic idea with group transmission is that a UE wanting to transmit data, which UE therefore may be named a source UE, instead of transmitting the data itself directly to the network, e.g. directly to a base station, utilizes one or more other UEs and transmits at least part of the data over SL(s) to these UEs, and then they transmit it further to the network, e.g. to the base station. This means that a UE can be enabled to transmit data to the network even without own network coverage and/or that the data can be transmitted with higher bandwidth, better coverage, etc. to the network than else would be possible. This may be of particular interests for UEs that correspond to M2M devices, e.g. sensors in areas with no or poor direct network coverage.

As realized, group transmission of this kind will introduce new situations and challenges that have to be handled. Some conventional solutions may no longer work, at least not without adaptation.

SUMMARY

In view of the above, an object is to provide one or more improvements or alternative in relation to the prior art, such as to support and facilitate employment of group transmission, e.g. of the kind indicated in the Background, in a wireless communication network.

According to a first aspect of embodiments herein, the objective is achieved by a first method, performed by one or more first devices, for supporting charging relating to a group transmission in a wireless communication network. Said group transmission involving a group of wireless devices configured to, via one or more direct communication links between each other, participate in transmission of user data between a source wireless device and the wireless communication network. The first device(s) initiate to obtain, for each one of wireless devices of the group, a data amount indicator indicating how much data the wireless device has been involved in transmitting as part of the group transmission. The first device(s) initiate to provide one or more reports based on the obtained data amount indicators to one or more core network nodes of the wireless communication network, which one or more core network nodes are involved in charging of wireless devices served by the wireless communication network.

According to a second aspect of embodiments herein, the objective is achieved by a second method, performed by one or more second devices, for supporting charging relating to a group transmission in a wireless communication network. Said group transmission involving a group of wireless devices configured to, via one or more direct communication links between each other, participate in transmission of user data between a source wireless device and the wireless communication network. The second device(s) initiate to obtain, by one or more core network nodes of the wireless communication network, one or more reports based on data amount indicators indicating how much data individual wireless devices have been involved in transmitting as part of the group transmission, which one or more core network nodes are involved in charging of wireless communication devices served by the wireless communication network.

According to a third aspect of embodiments herein, the objective is achieved by one or more first devices for supporting charging relating to a group transmission in a wireless communication network. Said group transmission involving a group of wireless devices configured to, via one or more direct communication links between each other, participate in transmission of user data between a source wireless device and the wireless communication network. The first device(s) is configured to initiate to obtain, for each one of wireless devices of the group, a data amount indicator indicating how much data the wireless device has been involved in transmitting as part of the group transmission. The first device(s) is further configured to initiate to provide one or more reports based on the obtained data amount indicators to one or more core network nodes of the wireless communication network, which one or more core network nodes are involved in charging of wireless devices served by the wireless communication network.

According to a fourth aspect of embodiments herein, the objective is achieved by one or more second device(s) for supporting charging relating to a group transmission in a wireless communication network. Said group transmission involving a group of wireless devices configured to, via one or more direct communication links between each other, participate in transmission of user data between a source wireless device and the wireless communication network. The second device(s) is configured to initiate to obtain, by one or more core network nodes of the wireless communication network, one or more reports based on data amount indicators indicating how much data individual wireless devices have been involved in transmitting as part of the group transmission, which one or more core network nodes are involved in charging of wireless communication devices served by the wireless communication network.

The data amount indicator(s) for the assisting wireless device(s) and provision of the corresponding report(s) to the core network node(s) involved in charging, enable information to core network node(s) that handle charging so they can apply different charging policies for the source wireless device and assisting wireless devices, respectively, e.g. so that assisting wireless devices can be rewarded for assisting in group transmission and e.g. in relation to the degree or level of assistance. Also, the source wireless device can be charged separately, e.g. in a conventional manner or specifically for utilizing group transmission.

Thanks to the possibility to reward assisting wireless devices, and separate from charging of the source wireless devices, i.e. the one being assisted, users and/or owners should become more motivated to accept or let their wireless devices be used to assist in group transmission, which is needed in practice to make group transmission be successful or even useful. This in turn should make operators more willing to employ group transmission in their wireless networks.

Hence, embodiments herein support and facilitate employment of group transmission in wireless communication networks.

BRIEF DESCRIPTION OF THE DRAWINGS

Examples of embodiments herein are described in more detail with reference to the appended schematic drawings, which are briefly described in the following.

DETAILED DESCRIPTION

Figure 1:
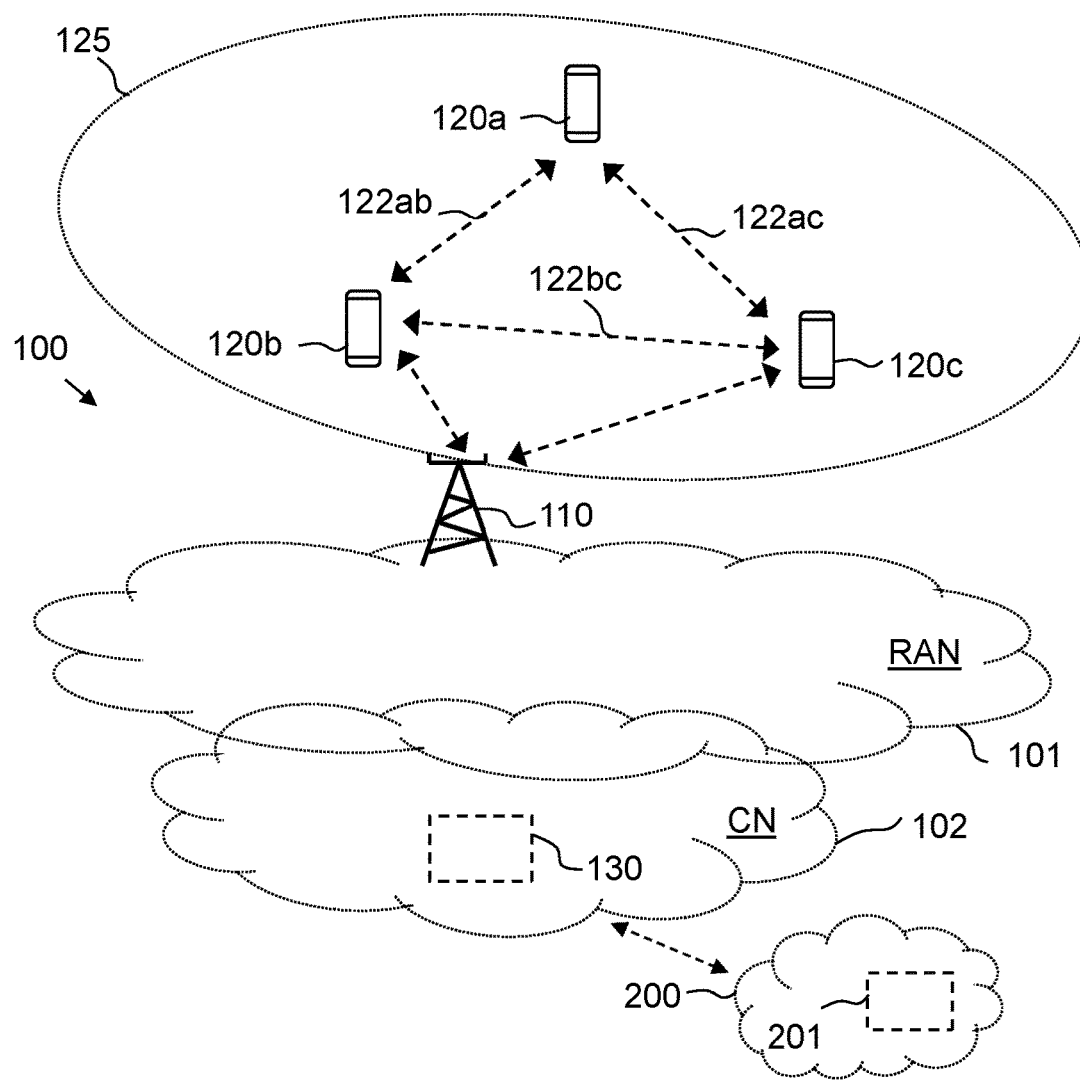
FIG. 1 is a block diagram schematically depicting a wireless communication network to be used for discussing embodiments herein.

Throughout the following description similar reference numerals may be used to denote similar elements, units, modules, circuits, nodes, parts, items or features, when applicable. Features that appear only in some embodiments of what is shown in a figure, are typically indicated by dashed lines in the drawings.

In the following, embodiments herein are illustrated by exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

FIG. 1 is a block diagram schematically depicting a wireless communication network 100 to be used for discussing and exemplifying embodiments herein, and in which embodiments herein may be implemented.

The wireless communication network 100 may comprise a Radio Access Network (RAN) 101 part and a Core Network (CN) 102 part. The wireless communication network 100 may be a telecommunication network or system, such as a cellular communication network that supports at least one Radio Access Technology (RAT), e.g. LTE, or 4G, and/or New Radio (NR) that also may be referred to as 5G, or even further generations.

The wireless communication network 100 typically comprises network nodes that are communicatively interconnected. The network nodes may be logical and/or physical and are located in one or more physical devices. The wireless communication network 100, typically the RAN 101, comprises one or more radio network nodes, e.g. radio network nodes 110. The radio network nodes are or comprise radio transmitting network nodes, such as base stations and/or are or comprises controlling nodes that control one or more radio transmitting network nodes. The radio network nodes are configured to serve and/or control and/or manage one or more wireless communication devices. Each radio network node provide one or more radio coverages, e.g. corresponding to one or more radio coverage areas, i.e. radio coverage that enables communication with one or more wireless communication devices. A wireless communication device may alternatively be named a wireless device and it may correspond to a UE etc. as mentioned in the Background. Each radio coverage may be provided by and/or associated with a particular Radio Access Technology (RAT). Each radio coverage area may correspond to a so called cell or a radio beam, that simply may be named a beam. As should be recognized by the skilled person, a beam is a more dynamic and relatively narrow and directional radio coverage compared to a conventional cell, and may be accomplished by so called beamforming. A beam is typically for serving one or a few communication devices at the same time, and may be specifically set up for serving this one or few communication devices. The beam may be changed dynamically by beamforming to provide desirable coverage for the one or more wireless communication devices being served by the beam. There may be more than one beam provided by one and the same radio network node.

Said radio network nodes may e.g. be communicatively connected, such as configured to communicate, over, or via, a certain communication interface and/or communication link.

Further, the wireless communication network 100, or rather the CN 202, comprises one or more core network nodes 130, that may be communicatively connected to each other and other network nodes, such as configured to communicate, over, or via, a communication interface and/or communication link, with radio network nodes of the RAN 201, e.g. with the radio network node 110.

The figure also shows wireless communication devices 120a-c for communication with the wireless communication network 100, e.g. by being served by the radio network node 110 when within radio coverage associated with it. In the shown view the wireless device 120a is located farthest away from the radio network node 110 and may have nor or poor direct communication capability with the wireless communication network 100, at least compared to the wireless communication devices 120b-c. This is indicated in the figure by the arrows between the wireless devices 120b-c and the radio network node 110. Further, the wireless devices 120a-c are capable of communication directly with each other over respective side links, SLs, as indicated in the figure by the arrows between the wireless devices 120a-c, i.e. side links 122ab, 122ac, 122bc. Further, the wireless devices 120a-c may correspond to a group 125 for group transmission, as will be further discussed separately below.

The figure also shows a further node 201 and a further network 200. The further node 201 may be located outside the wireless communication network 100, i.e. be an external node, as indicated in the figure, or alternatively (not indicated in the figure) be comprised in the wireless communication network 100 and thus be a network node thereof, e.g. a management node thereof. The further network node 201 may in principle be any node communicatively connected to the wireless communication network 100. Likewise, the further network 200 may be located outside the wireless communication network 100, i.e. be an external network, as indicated in the figure, e.g. corresponding to a so-called computer cloud, often simply referred to as cloud, that may provide and/or implement services and/or functions for and/or relating to the wireless communication network 100. The further network 200 may alternatively (not indicated in the figure) be comprised in the wireless communication network 100 and thus e.g. correspond to a subnetwork thereof. It is implied that a network 100 and the further network 200 comprises interconnected network nodes and may e.g. include the further node 201 as indicated in the figure. The further network 200 may in principle be any network communicatively connected to the wireless communication network.

Attention is drawn to that FIG. 1 is only schematic and for exemplifying purpose and that not everything shown in the figure may be required for all embodiments herein, as should be evident to the skilled person. Also, a wireless communication network or networks that correspond(s) to the wireless communication network 100, will typically comprise several further network nodes, such as further radio network nodes, e.g. base stations, network nodes, e.g. both radio and core network nodes, etc., as realized by the skilled person, but which are not shown herein for the sake of simplifying.

As a development towards embodiments herein, the situation indicated in the Background will first be further elaborated upon.

For better understanding of group transmission of the kind described in the Background and how such can be implemented, an example implementation will be described in some detail.

On a high level, consider a group of UEs, e.g. the wireless communication devices 120a-c, such as UEs in the form of sensor devices, that are D2D capable, i.e. able to communication with each other over sidelinks, i.e. SLs. The wireless communication devices 120a-c may correspond to the group 125 for group transmission. When a UE of the group has data to transmit, e.g. the wireless communication device 120a, it may first distribute the data to neighbouring UE(s) in the group over D2D link(s), i.e. the SLs. For example, wireless device 120a may send the data over SLs 122ab, 122ac to the wireless devices 120b-c. This first step may be referred to as a first hop. In a second step or hop, the UEs in the group may then cooperatively, or at least some UEs of the group able to do so, transmit the data to the wireless communication network 100, e.g. the wireless communication devices 120b-c may transmit respective parts of the data received from the wireless device 120a over the SLs, to the radio network node 110. This example was in the UL, in the DL, the network 100 may transmit data to the group as if it was a single UE. At least one UE in the group must be able to receive the DL data. If necessary, the DL data may then be relayed to the other UEs in the group via SLs. In case only a single UE of the group is meant to be recipient, the data may reach this UE via such relaying.

Group transmission like this may e.g. increase the UL coverage by combining transmissions from several UEs and may also be beneficial from a latency point of view compared to e.g. repeated transmissions that may be needed in case of bad radio coverage.

One identified challenge with group transmissions, is charging, i.e. the ability to be able to, typically based on data and/or network usage, charge individual UEs, say e.g. wireless communication device 120a for the amount of data it has used in the DL and/or UL. However, in case of the above group transmission example, the network may have no direct connection with this device and its data is delivered by wireless communication devices 120b and/or 120c. It would not be desirable if these devices were associated with and charged for data transmitted on behalf of wireless communication device 120a, it would rather be desirable or even required for practical success if they instead could be rewarded in some sense. To enable this, it is needed one or more ways to measure or get indication on how much data, e.g. a share of total data, the assisting wireless devices have assisted with.

In other words, a problem with cooperative transmissions is that since it is the group that transmits the data to the network it is not obvious how the charging, or more relevant perhaps, how to keep track of the amount of data transmitted per user, should be performed. A wireless device part of a group may transmit data outside the group, i.e. normal UL transmission, or with the group, i.e. group transmission. In both cases, the bearers used by core network are typically the own bearers of the wireless device, but charging policies should typically be different for a group transmission compared to a normal transmission, e.g. so that an operator can charge differently, such as at a cheaper rate for a group transmission, e.g. due to using less resources over radio, compared to a normal transmission. As a further aspect, the source wireless device, e.g. 120a, whose data the group, e.g. 125, is transmitting, is the wireless device that benefits from the transmission and should consequently be charged only or more for the group transmission than the assisting wireless devices, e.g. 120b-c that have no own benefit from the transmission.

It is also important to make other users willing to participate in a group transmission, especially for users that do not utilize the group transmission at all or not very much for themselves, but that still are very useful for other wireless devices acting as source wireless devices. Transmitting on behalf of another wireless device drain battery which is a serious drawback and makes the whole concept of group transmissions questionable in some scenarios. Without possibility to suitably separate group transmission charging from normal transmission charging, it will be difficult to motivate, e.g. through compensation or payback, assisting wireless devices to participate and there is a risk that too few chose to participate in group transmissions for these to be successful.

In the existing ProSE technology mentioned in the Background, in particular the Prose Layer 3 relaying function, see e.g. A new way of extending network coverage: Relay-assisted D2D communications in 3GPP, SungHoon Junga, Junsu Kimb, ICT Express 2 (2016), pages 117-121, a relay wireless device reports the context of a remote wireless device, such as an Evolved Packet switched System (EPS) bearer ID used for relaying, remote UE ID, e.g. International Mobile Subscriber Identity (IMSI) or Mobile Station International Subscriber Directory Number (MSISDN), and optionally, the IP address to a CN entity so that the CN entity can perform charge for the remote wireless device based on its transmitted data volume. Since the Prose Layer 3 relaying was originally designed for extension of coverage for MTC devices, meaning that both remote devices and relay devices are owned by the same owner, the charging method associated with it has several drawbacks and is not suitable for group transmissions as described above. Observed problems include:

1) In the existing Prose Layer 3 relaying, a relay wireless device serves one remote wireless device and it does not support a group transmission mode as above and the charging method does not work for such.
2) There is no payback mechanism for relaying wireless devices.

Figure 2:
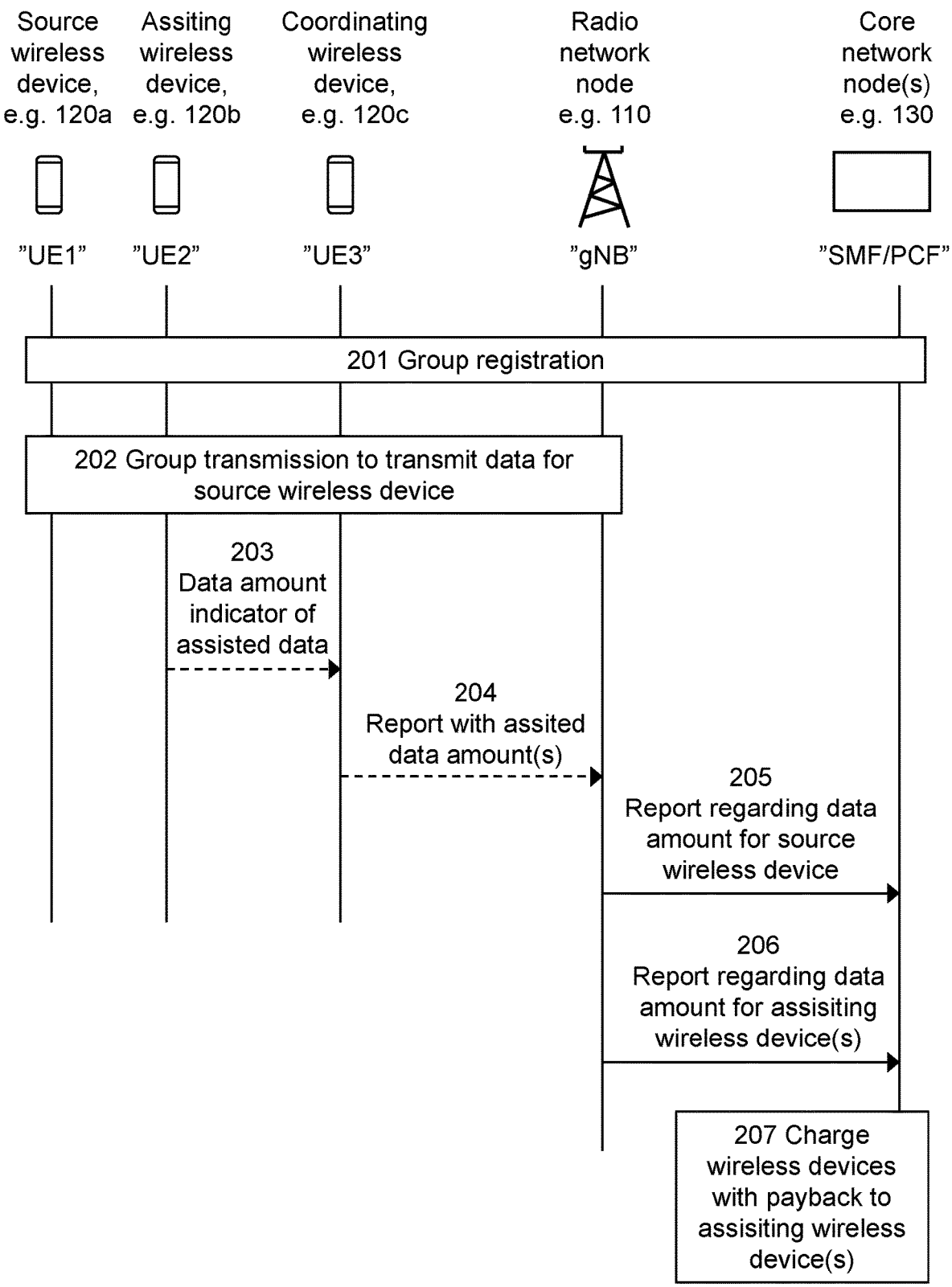
FIG. 2 is a combined signaling diagram and flowchart for describing method and actions according to some embodiments.

FIG. 2 depicts a combined signaling diagram and flowchart, which will be used to discuss some exemplifying embodiments.

The actions below, which may form a method, are for supporting charging relating to a group transmission in a wireless communication network, e.g. the wireless communication network 100. The group transmission involving a group, e.g. the group 125, of wireless devices, e.g. 120a-c, configured to, via one or more direct communication links, e.g. side links 122ab, 122ac, 122bc, between each other, participate in transmission of user data between a source wireless device, e.g. 120a, and the wireless communication network 100.

In the shown example, the wireless communication network 100 may e.g. be a 5G network. There is an assisting wireless device in the group 125, e.g. 120b and a coordinating wireless device, e.g. 120c. One or more, typically one, wireless device of the group may act as a group coordinator, i.e. be the coordinating wireless device for the group transmissions, here 120c. The coordinating wireless device may at the same time be an assisting wireless device. In some embodiments coordinating wireless device may even be the source wireless device or one of the source wireless devices. The coordinating wireless device, or simply coordinator, corresponds to a wireless device of the group that has been authorized to communicate information regarding all wireless devices of the group to/from the network.

Further involved nodes in the example is a radio network node, e.g. 110, that may be a gNB, and one or more core network nodes, e.g. 130, that should be such involved in charging, e.g. a Access and mobility Management Function (AMF) node and/or a Session Management Function (SMF) node and/or Policy Control Function (PCF) node and/or similar node(s). In for example a 5G core network (5GC), the AMF selects the PCF. Then the PCFsupply rules for QoS control and charging to SMF and the UE. Thus, the SMF, or SMF node(s), will typically be responsible to collect the necessary information for each UE for charging.

More generally and as should be recognized, a group transmission as here typically comprises several components including e.g. an associated group radio bearer, one or multiple source wireless devices, such as 120a, whose data are transmitted on the group radio bearer, and one or more assisting wireless devices, e.g. 120b and/or 120c, that participate in the group transmission and transmits at least part of the data from the source wireless device.

Embodiments herein may simplified be described as based on an idea of enabling forming of a volume report that may contain detailed information of who has made transmission and who has aided, i.e. assisted, another's transmission, information on the corresponding data volume and the transmission time. During and/or after every group transmission, associated volume report(s) may be signaled to the suitable core network node(s), e.g. 130, e.g. corresponding to SMF/PCF node or nodes. Different charging policies may then be applied for the source wireless device and assisting wireless devices respectively based on the volume report(s).

The actions below may be taken in any suitable order and/or be carried out fully or partly overlapping in time when this is possible and suitable.

Action 201

There is typically some group registration that should involve at least the nodes that subsequently need to be aware of that there is a group transmission and be able to act accordingly, and e.g. differently from normal transmission. The group registration may involve several sub actions. For example, the group registration may involve registration so that the involved wireless communication network 100, i.e. relevant parts thereof, e.g. the radio network node 110 and/or the core network node(s) 130, gets informed which wireless devices are part of the group, e.g. 125, and for example their role and/or function. Of course also the wireless devices part of the group need to get informed about the role they will have or may have in case of group transmission etc. The present action may e.g. determine and/or inform about which, or at least some, wireless device(s) part of the group, such as which wireless device is coordinating wireless device, assisting wireless device(s) and/or source wireless device.

The registration may e.g. be triggered by the network and/or the source wireless device 120a, e.g. based on that group transmission is possible and/or may be favorable over normal transmission. The group registration may be triggered in response to a real or potential need to perform group transmission, e.g. in advance when a situation occurs, or is identified to be about to occur, where group transmission is needed or beneficial.

The group registration may be performed in many different ways, e.g. according to any conventional way of performing group registration for any conventional way of performing group transmission, and is as such not central for embodiments herein.

Action 202

The actual group transmission takes part and involves the assisting wireless device 120b, and possibly 120c also acting as assisting wireless device, assisting the source wireless device 120a via SL(s) in transmission of data to/from the wireless communication network 100, more specifically to, or via, at least the radio network node 110. That is, data is transmitted for, or on behalf of, the source wireless device 120a. The group transmission as such may be performed in many different ways, e.g. according to any conventional way of performing group transmission.

This action, typically also the associated previous action, may thus not only correspond to such "two-hops" group transmission concept as indicated above, but may alternatively correspond to also other types of group transmission or relay transmission related scenarios. For example, in a SL transmission scenario, a remote wireless device, e.g. 120a, with bad cellular coverage may relay its data via SL to another relay wireless device, e.g. 120b, with better cellular coverage who can further forward the data to a radio network node, e.g. 110.

In some embodiments, no or only some role(s) of individual wireless devices of the group are determined in Action 201, or possible or potential roles, and in such case remaining roles may be determined at or during the group transmission as such based on present circumstances.

For example, to determine, during Action 201 and/or Action 202 if a wireless device may participle as an assisting wireless device or not, each wireless device of a group, e.g. 125, may measure radio channel quality of its connection to the radio network node, e.g. 110. A wireless device may assists in the group transmission only in case its measured radio channel quality is above a given, e.g. predefined and/or predetermined, threshold, which may be fully or partly configurable, e.g. by or via the radio network node 110 and/or a coordinating wireless device of the group, e.g. 120c. A wireless may also consider other information for determining if it may participate as assisting wireless device, such as remaining battery life, its buffer status, the priority of the data to be transmitted etc. For example, a wireless device with a specific measured radio quality and specific remaining battery may only participate in the group transmission if the priority of the data is above a certain level that may be predetermined or predefined, and/or configurable, for example by the network or user. In case a wireless device belongs to multiple groups, different thresholds may be used for each group. There may thus be different rules and parameters that determine if and possibly also how a wireless device will participate in a group transmission or not, e.g. as assisting wireless device.

It may not always be possible for the radio network node 110 or the network 100 to in advance know which wireless devices actually is to participate or have participated in a group transmission, e.g. as assisting wireless devices. The rules may e.g. depend on parameters which are not known to the radio network node 110. If a wireless device is to participate in a group transmission, the wireless device may thus need to inform the coordinating wireless device of this decision, e.g. wireless device 120*b* informing wireless device 120*c*.

Action 203

Assisting wireless device(s) involved in the group transmission of Action 202 sends a data amount indicator of assisted data to a coordinating wireless device, e.g. 120*c*, of the group, which thus receives, i.e. obtains, such indicator(s). All involved assisting devices should send its own indicator, but in the example it is exemplified by only 120*b*. Each data amount indicator should indicate how much data the assisting wireless device that the indicator belongs to has been involved in transmitting as part of the group transmission. The indictor will be further discussed and exemplified below.

In some embodiments the indicator is, or is based on, an identifier, measure or estimate of data volume. The data volume for a group transmission may be measured at different protocol layers. At a lower layer, more packet overhead may need to be added to the data volume. The data volume may e.g. be computed by a wireless device, e.g. the assisting wireless device 120*b*, when it receives and/or sends data as part of group transmission over SL. A wireless device may also measure or estimate data volumes separated depending on if it is its own data transmission, normal or as a source wireless in group transmission, or its part of group transmission as an assisting wireless device. Each wireless device of a group, e.g. both 120*a* and 120*b*, may then inform the coordinating wireless device, e.g. 120*c*, i.e. the group coordinator, of its data volume via data amount indicators as above, thereby also giving the wireless device 120*c* the possibility to compile a more detailed report for each wireless device of the group, or a single report with all this info. See next action for more info on this.

Action 204

The coordinating wireless device, may compile and send one or more reports based on at least the obtained data amount indicators of Action 203, to the radio network node 110, that receives, or obtains these reports. This way the group coordinator may signal collected data volume information, including its own and other group members, to its serving radio network node. To keep down separate signaling, info regarding all assisting wireless devices involved in the group transmission may be in a single report, but separate reports are possible.

In some embodiments, the coordinating wireless devise, e.g. based on the data amount indicators, estimate the data volume for each wireless device in the group based on whether the wireless device was a source or assisting wireless device of the group.

For assisting wireless devices, a scaling factor may be used to communicate and/or compute data volume. The scaling factor may be set according to how much the wireless device contributed to the group transmission, e.g. fraction of a total data volume. In a simple way, a higher value for wireless device that have contributed more. The scaling factor may have a value in a range between 0 and 1.

Action 205

The radio network node 110 that obtained the report(s) in Action 204, in turn compiles and sends a report regarding data amount for the source wireless device 120*a*. The report is sent, i.e. provided to, one or more core network nodes, e.g. 130, involved in charging, e.g. corresponding to a SMF and/or PCF node(s).

This report may be based on information received in the report of Action 204 but in some embodiments be based on information separately obtained. For example, the data amount of the group transmission could correspond to a data amount that the source wireless device otherwise could have sent in a conventional way and the radio network node 110 may already have capacity to determine such data amount. However, even in case of such capacity, it may still be preferred to send info about the data amount transmitted by the source wireless device, i.e. the data subject for the group transmission, with the report(s) in Action 204, when such is sent and the coordinating wireless device is already aware of the data amount for the source wireless device 120*a*.

The report, i.e. for the source wireless device 120*a*, may e.g. contain one or more of the following:
1) an identifier identifying the group, here group 125, e.g. a Group ID thereof,
2) an identifier identifying the source wireless device, e.g. a UE ID of wireless device 120*a*, such as a Source UE ID
3) information on data amount, e.g. data volume, transmitted for the source wireless device 120*a* as part of the group transmission,
4) one or more identifiers for identifying services relating the group transmission, such as Protocol Data Unit (PDU) session ID, flow ID, and/or associated priority identifiers such as 5QI or flow priority identifier etc.,
5) information specifying duration of the group transmission, e.g. transmission duration and/or transmission start and end time.

Action 206

The radio network node 110 that obtained the report(s) in Action 204, compiles and sends one or more further reports regarding data amount for assisting wireless device(s), based on the report received in Action 204. The report(s) is sent, i.e. provided to, said one or more core network nodes, e.g. 130, involved in charging, e.g. corresponding to a SMF and/or PCF and/or AMF node(s).

The one or more further reports, such as one per assisting wireless device, may e.g. contain one or more of the following:
1) an identifier identifying the group, here group 125, e.g. Group ID thereof,
2) an identifier identifying the source wireless device, e.g. UE ID of wireless device 120*a*, such as Source UE ID,
3) an identifier identifying the assisting wireless communication device, e.g. 120*b*, such as Assisting UE ID,
4) information on data amount, e.g. data volume, that the wireless communication device, e.g. 120*b*, has assisted with as part of the group transmission transmitted for the source wireless device 120*a* as part of the group transmission.

The information on data amount may comprise a scaling factor that indicates a level at which the assisting wireless communication device, e.g. 120*b*, has assisted in the group transmission, e.g. an assisting scaling factor that indicates the level that the assisting wireless device has aided the transmission.

In some embodiments the present action corresponds to that the radio network node 110 forwards, with no or small modifications, the report received in Action 204.

In some embodiments, the reports in Actions 205 and 206 are one and the same report, with information contained in different parts thereof, e.g. separated per involved wireless device and/or role in the group transmission.

The report(s) in Actions 204 and/or 205 and/or 206 regarding data volume may be sent after every group transmission or be aggregated in different ways. For example, aggregation may be done for every t1 time units, every nth group transmission, when there has not been a group transmission for t2 time units or when a PDF session has ended, or some combination between these Action 207

After having received the reports in Actions 205-206, the core network node(s) 130, e.g. SMF/PCF/AMF, may use the information of the reports to charge wireless devices of the group with e.g. payback to assisting wireless device(s). That is, wireless device 120a may be charged in a conventional manner but assisting wireless devices, e.g. wireless device 120b and possibly also 120c may be rewarded in some respect.

The core network node(s) 130 may thus perform charging for the relevant wireless devices differently, e.g. source and assisting wireless devices may be charged differently. In addition, the assisting wireless device(s) may get some bonus or similar paid back due to their assistance.

In other words, the solution to the problem of how to make other users be willing to participate in a group transmission even though they have little or no own data for transmission, may be to utilize a pay-back, e.g. through one or more payback charging parameters in the SMF/PCF/AMF. This means users in the group that does not transmit its own data, e.g. corresponding to the assisting wireless device 120b, may be rewarded with some pay-back in terms of e.g. cost, volume, bit-rate etc.

A source wireless device benefits from a group transmission so that the total transmission time would be shorter and coverage better. Therefore, e.g. the source wireless device 120a may be charged with higher rate for its group transmission assisted by other wireless devices.

The core network node(s) 130 may apply the charging policy since the above embodiments may provide information that allows the core network node(s) 130 to identify relevant data volumes and e.g. source wireless device.

In general, information on data volume of assisting wireless devices may be based on e.g. knowledge of which wireless devices belong to the group, e.g. known from Action 201 or even more detailed information of which wireless devices actually participated in the transmission, e.g. in Action 202.

Figure 3:
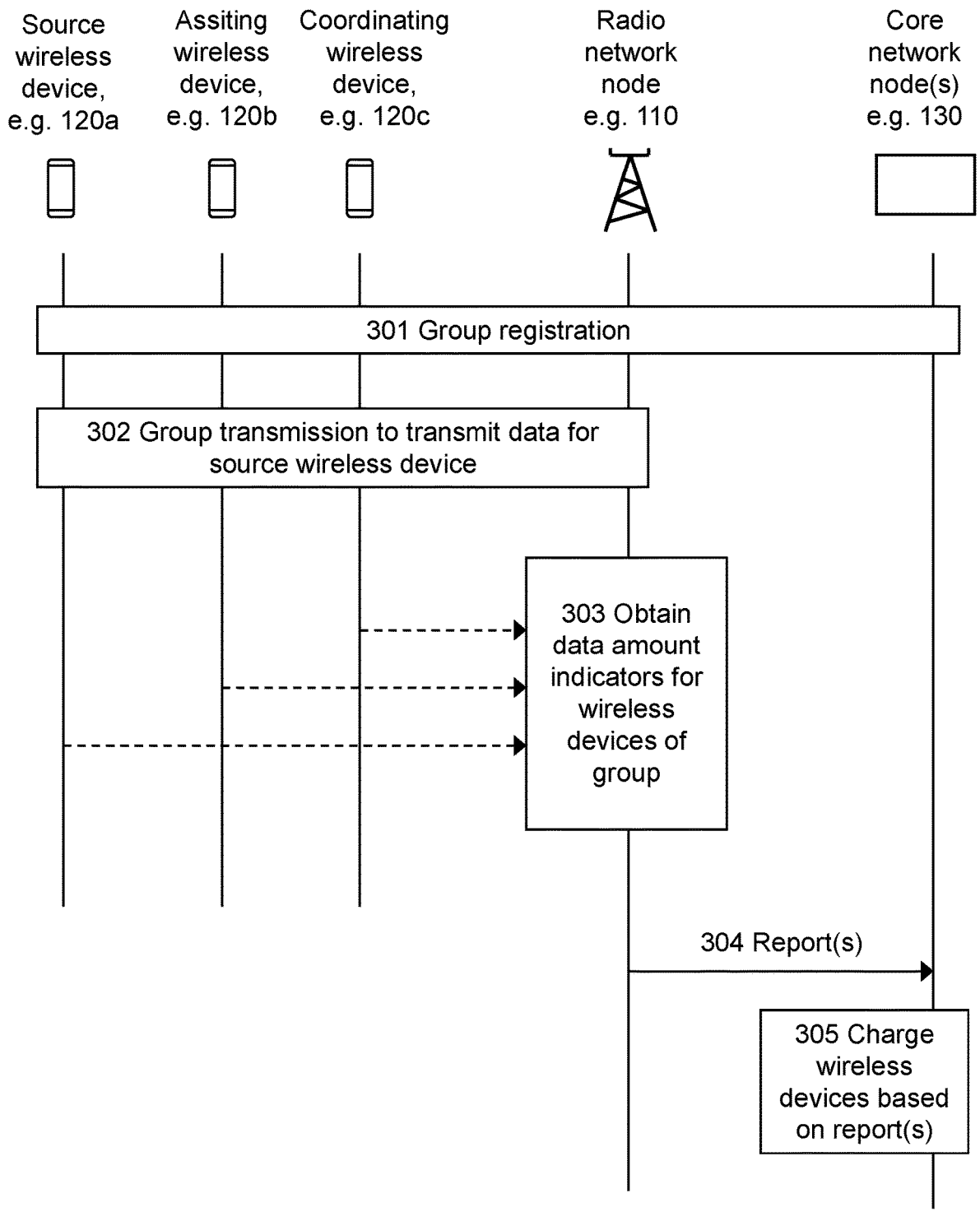
FIG. 3 is a combined signaling diagram and flowchart for describing method and actions according to some further embodiments.

FIG. 3 depicts another combined signaling diagram and flowchart, which will be used to discuss some further exemplifying embodiments.

As may be recognized, the diagram and flowchart of FIG. 3 is similar to the one in FIG. 2 and both are based on that there is a radio network node that obtains data amount indicators and may then compile, or form, one or more reports that are sent to involved core network node(s). FIG. 3 however, will be used for describing such embodiments a bit more generalized.

The actions below, which may form a method are, also here for supporting charging relating to a group transmission in a wireless communication network, e.g. the wireless communication network 100. Also here the group transmission involves a group, e.g. the group 125, of wireless devices, e.g. 120a-c, configured to, via one or more direct communication links, e.g. side links 122ab, 122ac, 122bc, between each other, participate in transmission of user data between a source wireless device, e.g. 120a, and the wireless communication network 100. There is an assisting wireless device in the group 125, e.g. 120b and a coordinating wireless device, e.g. 120c, i.e. similar as above.

The actions below may be taken in any suitable order and/or be carried out fully or partly overlapping in time when this is possible and suitable.

Action 301

Group registration is typically performed and based on the type of group transmission used.

This action may fully or partly correspond to Action 201 discussed above.

Action 302

The group transmission takes part according to type of group transmission used.

This action may fully or partly correspond to Action 202 discussed above.

Action 303

The radio network node 110 obtains, for each one of wireless devices 120 of the group 125, a respective data amount indicator indicating how much data the wireless device 120 has been involved in transmitting as part of the group transmission. That is, should be at least one indicator per wireless device, at least for the assisting wireless devices involved in the group transmission.

As indicated in the figure, the radio network node 110 typically obtains the indicators by receiving the indicators from the involved wireless devices, directly or indirectly, at least from the involved assisting wireless devices, e.g. 120b and/or 120c, but may also receive from the source wireless device 120a in some embodiments. In some embodiments, the indicators may be received via the coordinating wireless device, e.g. 110c.

This action is similar to Action 203, but where the data amount indicators are received by the radio network node 110 instead of the coordinating wireless device 120c. discussed above.

Action 304

The radio network node 110 then sends one or more reports based on the obtained data amount indicators to the core network node(s) 130, i.e. to relevant such node(s) involved in charging of wireless communication devices.

In some embodiments where the radio network node 110 receives the data amount indicators in reports, respectively, in Action 303, the present comprise that the radio network node 110, with no or small modifications, forwards the received reports. In other embodiments, the radio network node 110, compiles, or forms, the report(s) of the present action before sending them.

The report(s) sent may correspond to those discussed above under Actions 205, 206.

This action is similar to Actions 204-206 discussed above.

Action 305

The core network node(s) 130 that received the reports may then use them to charge the wireless devices, i.e. based on the report(s).

This action may fully or partly correspond to Action 207.

Figure 4:
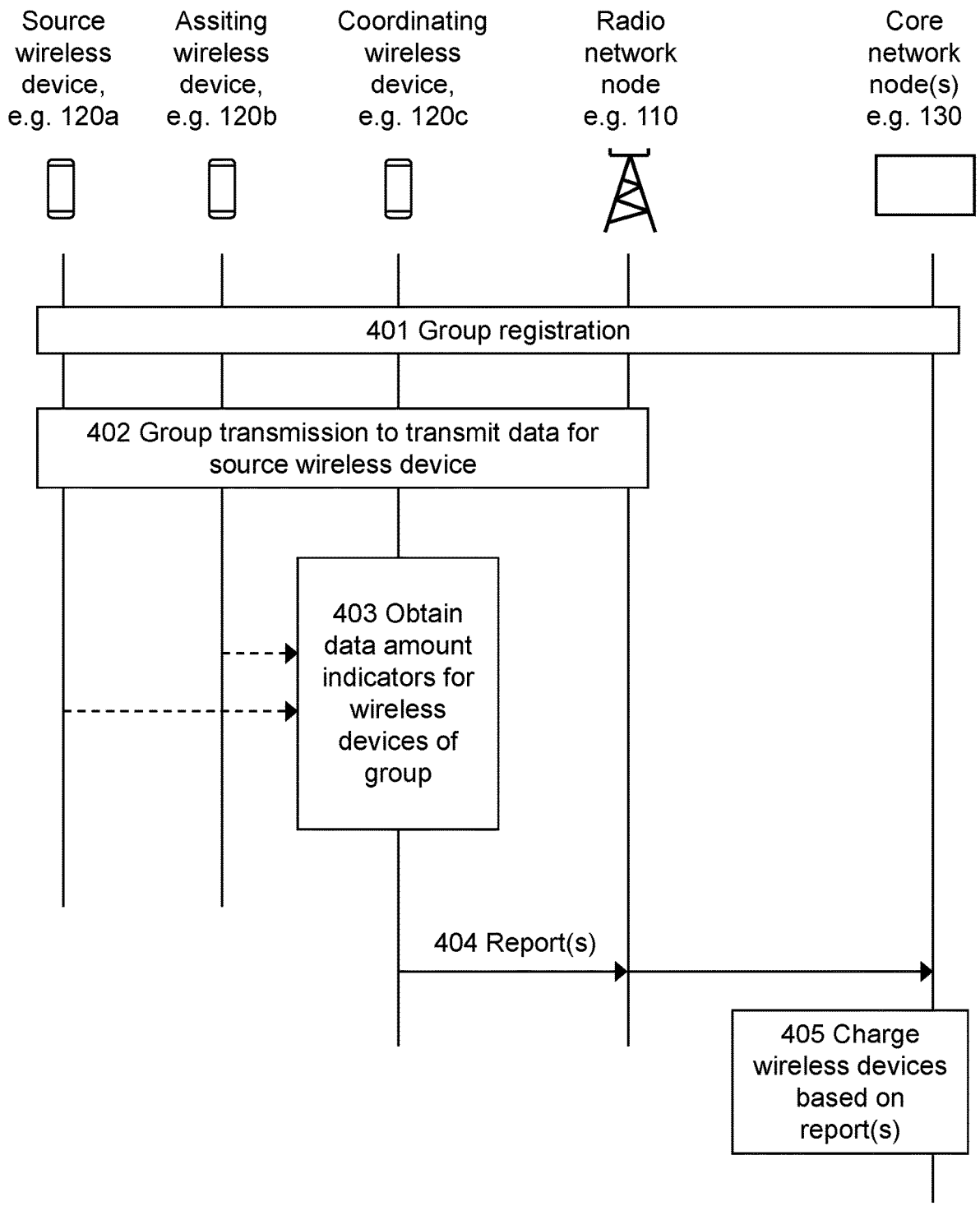
FIG. 4 is a combined signaling diagram and flowchart for describing method and actions according to some yet further embodiments.

FIG. 4 depicts yet another combined signaling diagram and flowchart, which will be used to discuss some even further exemplifying embodiments.

As may be recognized, the diagram and flowchart of FIG. 4 is similar to the one in FIG. 3 but based on that a coordinating wireless device obtains data amount indicators and may then compile, or form, one or more reports that are sent to core network node(s).

The actions below, which may form a method are, also here for supporting charging relating to a group transmission in a wireless communication network, e.g. the wireless communication network 100. Also here the group transmission involves a group, e.g. the group 125, of wireless devices, e.g. 120a-c, configured to, via one or more direct communication links, e.g. side links 122ab, 122ac, 122bc, between each other, participate in transmission of user data between a source wireless device, e.g. 120a, and the wireless communication network 100. There is an assisting wireless device in the group 125, e.g. 120*b* and a coordinating wireless device, e.g. 120*c*, i.e. similar as above.

The actions below may be taken in any suitable order and/or be carried out fully or partly overlapping in time when this is possible and suitable.

Action 401

Group registration is typically performed and based on the type of group transmission used.

This action may fully or partly correspond to any one of Actions 201, 301 discussed above.

Action 402

The group transmission takes part according to type of group transmission used.

This action may fully or partly correspond to any one of Actions 202, 302 discussed above.

Action 403

The coordinating wireless device 120*c* obtains, for each one of wireless devices 120 of the group 125, a respective data amount indicator indicating how much data the wireless device 120 has been involved in transmitting as part of the group transmission. That is, there should be at least one indicator per involved wireless device, at least for the assisting wireless devices involved in the group transmission.

As indicated in the figure, the coordinating wireless device 120*c* typically obtains the indicators by receiving the indicators directly or indirectly from the other involved wireless devices over SLs, that is, receive at least from the involved assisting wireless devices, e.g. 120*b*, but may also receive from the source wireless device 120*a* in some embodiments.

Each wireless device participating the group transmission, e.g. 120*b*, may thus report its data amount indicator(s), e.g. report its data volume information, to the coordinating wireless device 120*c*. Each wireless device may, e.g. during Action 401 and/or 402, have sent a request message to the group coordinator asking the permission to participate in group transmission and may after it has participated in group transmission inform the coordinating wireless device 120*c* on the data volume through the data amount indicator.

In some embodiments, the group coordinator determines or estimates which wireless devices that have participated in the group transmission and may request and/or use data amount indicators from these. A default assumption may be that wireless devices in of the same group have participated.

This action is similar to Action 303, but where the data amount indicators are received by the coordinating wireless device 120*c* instead of the radio network node 110.

Action 404

The coordinating wireless device 120*c* then sends one or more reports based on the obtained data amount indicators to the core network node(s) 130, i.e. to relevant such involved in charging of wireless communication devices, e.g. SMF and/or PCT node(s) via the radio network node 110.

In some embodiments where the coordinating wireless device 120*c* receives the data amounts indicators in reports, respectively, in Action 403, the present action may comprise that the coordinating wireless device 120*c*, with no or small modifications, forwards the received reports. In some embodiments, the coordinating wireless device 120*c*, compiles, or forms, the report(s) of the present action before sending them.

The report(s) sent may correspond to such discussed above under Actions 205, 206.

This action is thus similar to Action 303 discussed above, but where the coordinating wireless device is more involved and the radio network node 110 can be lesser involved, which e.g. can be beneficial if adaptation of radio network nodes is less desirable for implementation of embodiments.

Action 405

The core network node(s) 130 that received the reports in Action 404 may then use them to charge the wireless devices, i.e. based on the report(s).

This action may fully or partly correspond to any one of Actions 207, 305 discussed above.

In some embodiments, not illustrated in the embodiments covered by the figures discussed above, each wireless device of a group, at least those that have participated in group transmission, forms and sends their own report, corresponding to a suitable report as in Actions 205, 206 above, to the core network node(s) 130. Each such report may be sent via SLs and other wireless devices and/or via the radio network node 110.

Figure 5:
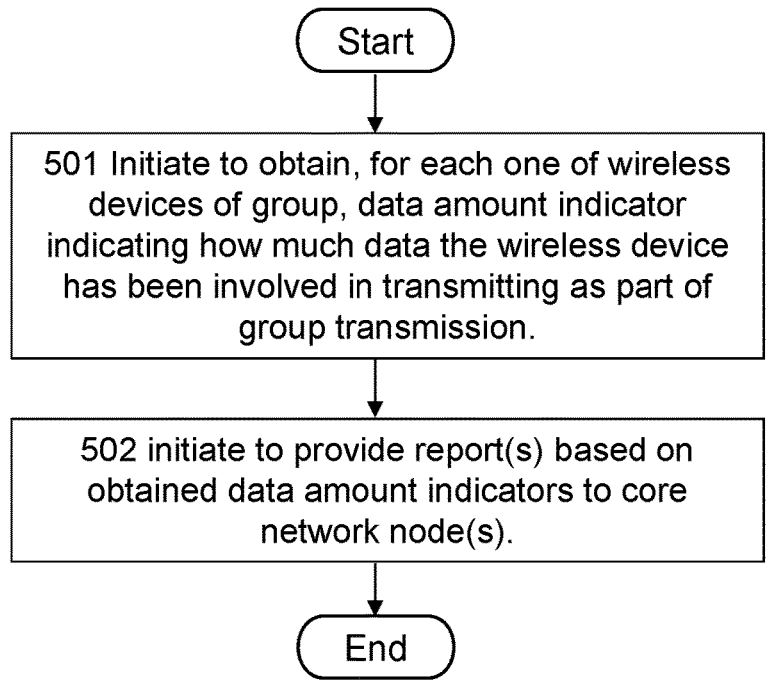
FIG. 5 is a flowchart schematically illustrating actions related to embodiments of a first method.

FIG. 5 is a flowchart schematically illustrating embodiments of a first method according to embodiments herein. The first method is for supporting charging relating to a group transmission in a wireless communication network, e.g. the wireless communication network 100. The group transmission involves a group, e.g. the group 125, of wireless devices, e.g. 120*a-c*, configured to, via one or more direct communication links, e.g. side links 122*ab*, 122*ac*, 122*bc*, between each other, participate in transmission of user data between a source wireless device, e.g. 120*a*, and the wireless communication network 100. There may be an assisting wireless device in the group 125, e.g. 120*b* and a coordinating wireless device, e.g. 120*c*, i.e. similar as above.

The first method may be performed by one or more first devices, e.g. the radio network node 110, a wireless device of the group 125, e.g. the wireless device 120*c*, the further node 201 and/or the further network 200.

Hence:

In some embodiments, said one or more first devices is a radio network node, e.g. the radio network node 110, comprised in the wireless communication network 100 and configured to serve one or more of the wireless devices 120*a-c* of the group 125.

In some embodiments, said one or more first devices is a coordinating wireless device, e.g. 120*c*, being a wireless communication device of the group 125 assigned to act as a coordinator for the group 125 regarding at least the group transmission.

Action 501

The first node initiates to obtain, for each one of wireless devices of the group, e.g. each one of wireless devices 120*b-c* acting as assisting wireless devices, a data amount indicator indicating how much data the wireless device has been involved in transmitting as part of the group transmission. When a single such wireless device of the group is referred to in the following, it will be referred to as the wireless device 120*b* to simplify, although the corresponding thing may be performed in relation to each one of several assisting wireless devices of the group.

As used herein, a first device that initiates to perform an action, e.g. to obtain or to provide, refers to any pre-action and/or sub-action that causes or makes the action to be performed. The initiation, i.e. pre-action and/or sub-action, may be performed by the device that performs the action itself or another entity. A device that change from not performing an action to actively performing an action itself will include some initiation to perform the action, or in other words, initiate to perform an action is included when a device itself performs the action. Initiation of an action performed by another entity than performing the action itself may correspond to some signal provided or action performed by the other entity, e.g. trigger signal, that causes the device to perform the action.

In some embodiments where said one or more first devices is the radio network node 110, the radio network node 110 obtains one or more of the data amount indicators by receiving them from one or more of the wireless communication devices, e.g. 120*a-c*, of the group 125.

In some embodiments where said one or more first devices is the radio network node 110, the radio network node 110 obtains one or more of the data amount indicators by receiving them from a coordinating wireless device, e.g. 120*c*, being a wireless communication device of the group 125 assigned to act as a coordinator for the group 125 regarding at least the group transmission.

In some embodiments where said one or more first devices is the coordinating wireless device 120*c*, the coordinating wireless device 120*c* obtains one or more of the data amount indicators by receiving them from one or more of the wireless communication devices, e.g. 120*a-b*, of the group 125.

The present action may fully or partly correspond to any one of Actions 203, 303, 403 discussed above.

Action 502

The first node initiates to provide one or more reports based on the obtained data amount indicators to one or more core network nodes, e.g. the core network node(s) 130, of the wireless communication network 100. Said one or more core network nodes 130 should be such involved in charging of wireless devices served by the wireless communication network 100.

Said one or more reports may separate reporting relating to the source wireless device 120*a* from reporting relating to one or more other wireless devices, e.g. 120*b-c*, of the group 125 and that assist with the group transmission.

At least one of said one or more reports may relate to the source wireless device 120*a* and may comprise one or more of the following:
    information on data amount transmitted for the source wireless device 120*a*, i.e. for assisting the source wireless device 120*a* in transmitting or receiving, as part of the group transmission,
    an identifier identifying the group 125,
    an identifier identifying the source wireless device 120*a*,
    information specifying duration of the group transmission,
    one or more identifiers for identifying services relating the group transmission.

Such report(s) may correspond to those described above under Action 205.

At least one of said one or more reports may relate to a wireless communication device 120*b* of the group 125 and that assisted with the group transmission, and may comprise one or more of the following:
    information on data amount that the wireless communication device 120*b* has assisted with as part of the group transmission,
    an identifier identifying the source wireless device 120*a*,
    an identifier identifying the wireless communication device 120*b* itself.

Said information on data amount that the wireless communication device 120*b* has assisted with as part of the group transmission may comprises a scaling factor that indicates a level at which the wireless communication device 120*b* has assisted in the group transmission. The information on data amount and/or scaling factor may correspond to, or comprise, or be based on, the data amount indicator obtained for the wireless device in question.

In some embodiments where said one or more first devices is the radio network node 110, the radio network node 110 obtains, in Action 501, one or more of the data amount indicators by receiving them and at least one of the data amount indicators comprised in one or more reports, wherein the radio network node 110 in the present action provides such report(s) to the core network node(s) 130 by sending them further to said core network node(s) 130.

In some embodiments where said one or more first devices is the radio network node 110, the radio network node 110 provides at least one of said reports by forming it and sending the formed report to said one or more core network nodes 130.

In some embodiments where said one or more first devices is the coordinating wireless device 120*c*, the coordinating wireless device 120*c* provides said one or more reports by sending them to said one or more core network nodes 130, typically via a radio network node, e.g. 110, configured to serve at least the coordinating wireless device 120*c* of the group 125.

In some embodiments where said one or more first devices is the coordinating wireless device 120*c*, the coordinating wireless device 120*c*, in Action 501, receives at least one of the data amount indicators comprised in one or more of said reports and provide these reports to said one or more core network nodes 130 in the present action by sending them further to said one or more core network nodes 130.

In some embodiments where said one or more first devices is the coordinating wireless device 120*c*, the coordinating wireless device 120*c* provides at least one of said reports by forming it and sending the formed report to said one or more core network nodes 130.

The present action may fully or partly correspond to any one of Actions 204, 206, 304, 404 discussed above.

Figure 6:
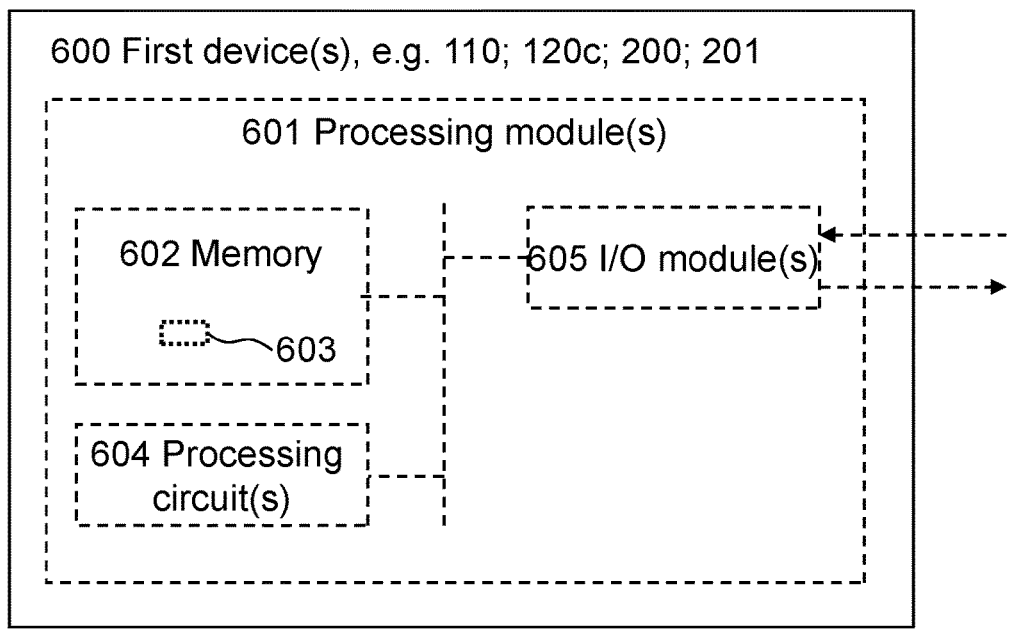
FIG. 6 is a functional block diagram for illustrating embodiments of first device(s) and how it can be configured to carry out the first method.

FIG. 6 is a schematic block diagram for illustrating embodiments of one or more first devices 600. The schematic block diagram is also used for illustrating embodiments of how the first device(s) 600 may be configured to perform the first method and actions thereof as discussed above in relation to FIG. 5.

Hence, the first device(s) 600 is for supporting charging relating to a group transmission in a wireless communication network, e.g. the wireless communication network 100. The group transmission involves a group, e.g. the group 125, of wireless devices, e.g. 120*a-c*, configured to, via one or more direct communication links, e.g. side links 122*ab*, 122*ac*, 122*bc*, between each other, participate in transmission of user data between a source wireless device, e.g. 120*a*, and the wireless communication network 100. There may be an assisting wireless device in the group 125, e.g. 120*b* and a coordinating wireless device, e.g. 120*c*, i.e. similar as above.

The first device(s) may comprise or be the radio network node 110, a wireless device of the group 125, e.g. the wireless device 120*c*, the further node 201 and/or the further network 200.

The first device(s) 600 may comprise processing module(s) 601, such as a means, one or more hardware modules, including e.g. one or more processors, and/or one or more software modules for performing said method and/or actions.

The first device(s) 600 may further comprise memory 602 that may comprise, such as contain or store, a computer program 603. The computer program 603 comprises 'instructions' or 'code' directly or indirectly executable by the first device(s) 600 to perform said method and/or actions. The memory 602 may comprise one or more memory units and may further be arranged to store data, such as configurations and/or applications involved in or for performing functions and actions of embodiments herein.

Moreover, the first device(s) 600 may comprise processing circuit(s) 604 as exemplifying hardware module(s) and may comprise or correspond to one or more processors. In some embodiments, the processing module(s) 601 may comprise, e.g. 'be embodied in the form of' or 'realized by' the processing circuit(s) 604. In these embodiments, the memory 602 may comprise the computer program 603 executable by the processing circuit(s) 604, whereby the first device(s) 600 is operative, or configured, to perform said method and/or actions thereof.

Typically the first device(s) 600, e.g. the processing module(s) 601, comprises Input/Output (I/O) module(s) 605, configured to be involved in, e.g. by performing, any communication to and/or from other units and/or nodes, such as sending and/or receiving information to and/or from other nodes or devices. The I/O module(s) 605 may be exemplified by obtaining, e.g. receiving, module(s) and/or providing, e.g. sending, module(s), when applicable.

Further, in some embodiments, the first device(s) 600, e.g. the processing module(s) 601, comprises one or more of initiating module(s), obtaining module(s), and providing module(s), as exemplifying hardware and/or software module(s). These modules may be fully or partly implemented by the processing circuit(s) 604.

Hence:

The first device(s) 600, and/or the processing module(s) 601, and/or the processing circuit(s) 604, and/or the I/O module(s) 605, the initiating module(s) and/or the obtaining module(s) may be operative, or configured, to initiate to obtain, for each one of wireless devices, e.g. 120*a-c*, of the group, e.g. 125, said data amount indicator indicating how much data the wireless device has been involved in transmitting as part of the group transmission.

Further, the first device(s) 600, and/or the processing module(s) 601, and/or the processing circuit(s) 604, the initiating module(s) and/or the providing module(s) may be operative, or configured, to initiate to provide said one or more reports based on the obtained data amount indicators to said one or more core network nodes, e.g. 130.

In some embodiments, the first device(s) 600 is said radio network node, e.g. 110, and/or the processing module(s) 601, and/or the processing circuit(s) 604, and/or the I/O module(s) 605, and/or the initiating module(s) and/or the obtaining module(s) may be operative, or configured to obtain said one or more of the data amount indicators by receiving them from one or more of the wireless devices, e.g. 120*a-b*, of the group 125.

In some embodiments, the first device(s) 600 is said radio network node, e.g. 110, and/or the processing module(s) 601, and/or the processing circuit(s) 604, and/or the I/O module(s) 605, and/or the initiating module(s) and/or the obtaining module(s) may be operative, or configured to obtain said one or more of the data amount indicators by receiving them from said coordinating wireless device, e.g. 120*c*.

In some embodiments, where the first device(s) 600 is said radio network node e.g. 110, the first device(s) 600 and/or the processing module(s) 601, and/or the processing circuit(s) 604, and/or the I/O module(s) 605, and/or the initiating module(s) and/or the obtaining module(s) may be operative, or configured to obtain said one or more of the data amount indicators by receiving at least one of the data amount indicators comprised in one or more of said reports. In these embodiments, the radio network node, e.g. 110, and/or the processing module(s) 601, and/or the processing circuit(s) 604, and/or the I/O module(s) 605, and/or the initiating module(s) and/or the providing module(s) may be further operative, or configured to provide these reports to said one or more core network nodes 130 by sending them further to said one or more core network nodes 130.

In some embodiments, where the first device(s) 600 is said radio network node e.g. 110, the radio network node 110, and/or the processing module(s) 601, and/or the processing circuit(s) 604, and/or the I/O module(s) 605, and/or the initiating module(s) and/or the providing module(s) may be operative, or configured to provide at least one of said reports by forming it and sending the formed report to said one or more core network nodes 130.

In some embodiments, where the first device(s) 600 is said coordinating wireless device 120*c*, the first device(s) and/or the processing module(s) 601, and/or the processing circuit(s) 604, and/or the I/O module(s) 605, and/or the initiating module(s) and/or the obtaining module(s) may be operative, or configured, to obtain said one or more of the data amount indicators by receiving them from one or more of the wireless devices, e.g. 120*a-b*, of the group 125.

In some embodiments, where the first device(s) 600 is said coordinating wireless device 120*c*, the first device(s) and/or the processing module(s) 601, and/or the processing circuit(s) 604, and/or the I/O module(s) 605, and/or the initiating module(s) and/or the obtaining module(s) may be operative, or configured, to obtain at least one of the data amount indicators by receiving it comprised in said one or more of said reports. In these embodiments, the first device(s) and/or the processing module(s) 601, and/or the processing circuit(s) 604, and/or the I/O module(s) 605, and/or the initiating module(s) and/or the providing module(s) may be operative, or configured, to provide these reports to the one or more core network nodes 130 by sending them further to said one or more core network nodes 130.

In some embodiments, where the first device(s) 600 is said coordinating wireless device 120*c*, the first device(s) and/or the processing module(s) 601, and/or the processing circuit(s) 604, and/or the I/O module(s) 605, and/or the initiating module(s) and/or the providing module(s) may be operative, or configured, to provide said one or more reports by sending them to said one or more core network nodes 130.

In some embodiments, where the first device(s) 600 is said coordinating wireless device 120*c*, the first device(s) and/or the processing module(s) 601, and/or the processing circuit(s) 604, and/or the I/O module(s) 605, and/or the initiating module(s) and/or the providing module(s) may be operative, or configured, to provide at least one of said reports by forming it and sending the formed report to the one or more core network nodes 130.

Figure 7:
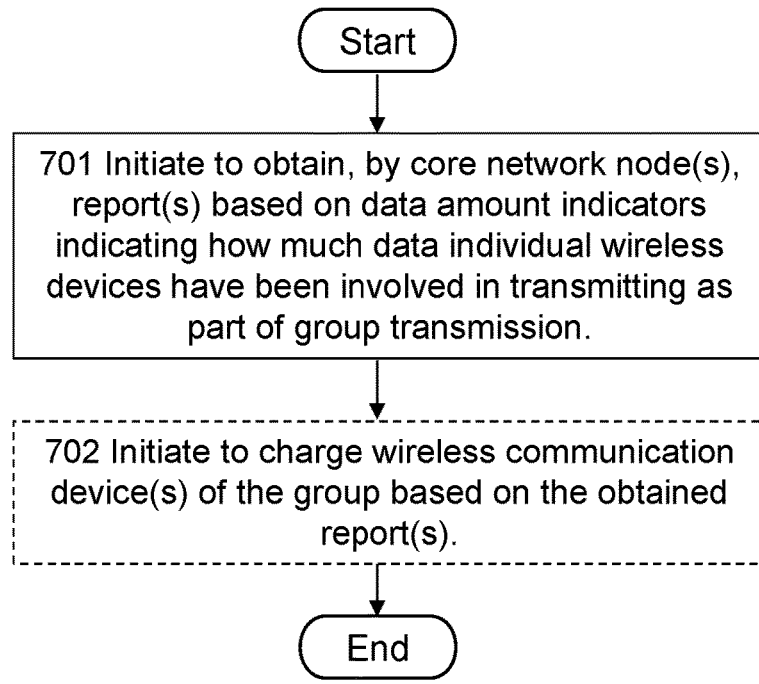
FIG. 7 is a flowchart schematically illustrating actions related to embodiments of a second method.

FIG. 7 is a flowchart schematically illustrating embodiments of a second method according to embodiments herein. The second method is also for supporting charging relating to a group transmission in a wireless communication network, e.g. the wireless communication network 100. The group transmission involves a group, e.g. the group 125, of wireless devices, e.g. 120*a-c*, configured to, via one or more direct communication links, e.g. side links 122*ab*, 122*ac*, 122*bc*, between each other, participate in transmission of user data between a source wireless device, e.g. 120*a*, and the wireless communication network 100. There may be an assisting wireless device in the group 125, e.g. 120*b* and a coordinating wireless device, e.g. 120*c*, i.e. similar as above.

The second method may be performed by one or more second devices, e.g. said one or more core network nodes 130, the further node 201 and/or the further network 200.

Action 701

The second node(s) initiates to obtain, by one or more core network nodes, e.g. 130, of the wireless communication network 100, one or more reports based on data amount indicators indicating how much data individual wireless devices, e.g. one or more of 120*a-c*, have been involved in transmitting as part of the group transmission. Said one or more core network nodes 130 should be involved in charging of wireless communication devices served by the wireless communication network 100.

Said one or more reports may separate reporting relating to the source wireless device 120*a* from reporting relating to one or more other wireless devices, e.g. 120*b-c*, of the group 125 that assist with the group transmission.

At least one of said one or more reports may relate to the source wireless device 120*a* and may comprise one or more of the following:
- information on data amount transmitted for the source wireless device 120*a*, i.e. for assisting the source wireless device 120*a* in transmitting or receiving, as part of the group transmission,
- an identifier identifying the group 125,
- an identifier identifying the source wireless device 120*a*,
- information specifying duration of the group transmission,
- one or more identifiers for identifying services relating the group transmission.

Such report(s) may correspond to such described above under Action 205.

At least one of said one or more reports may relate to a wireless communication device 120*b* of the group 125 that assisted with the group transmission and may comprise one or more of the following:
- information on data amount that the wireless communication device 120*b* has assisted with as part of the group transmission,
- an identifier identifying the source wireless device 120*a*,
- an identifier identifying the wireless communication device 120*b* itself.

Said information on data amount that the wireless communication device 120*b* has assisted with as part of the group transmission may comprises a scaling factor that indicates a level at which the wireless communication device 120*b* has assisted in the group transmission. The information on data amount and/or scaling factor may correspond to, or comprise, or be based on, the data amount indicator obtained for the wireless device in question.

In some embodiments where said one or more second devices are said one or more core network nodes 130, said one or more core network nodes 130 obtain at least one of the reports by receiving it from a radio network node, e.g. 110, comprised in the wireless communication network 100 and configured to serve one or more of the wireless devices, e.g. one or more of 120*a-c*, of the group 125.

In some embodiments where said one or more second devices are said one or more core network nodes 130, said one or more core network nodes 130 obtain at least one of the reports by receiving it from one or more wireless devices, e.g. 120*a-c*, of the group 125.

The present action may fully or partly correspond to any one of Actions 206, 304, 404 discussed above.

Action 702

The second node(s) may initiate to charge wireless communication devices, e.g. 120*a-c*, of the group 125 based on the obtained one or more reports.

In some embodiments, the charging is further based on a predetermined charging policy that separates charging relating to the source wireless device 120*a* from charging relating to the other one or more wireless devices 120*b-c* of the group 125.

In some embodiments, the charging is further based on rewarding one or more of the wireless communication devices 120*b-c* of the group 125 that have assisted in the group transmission. Examples of rewarding was given above. As used herein, rewarding may be base on taking an action that directly or indirectly make the wireless device or a user thereof to get in a better position than without the action. The reward may be associated with setting or changing certain, typically predetermined, parameter(s) used and/or controlled by the core network node(s), e.g. for the purpose of charging, which parameters are associated with cost and/or payback. Setting or changing the parameter, or value(s) thereof, should thus result in a lower cost or increased pay-back.

Charging as used herein is concept well recognized in the context of wireless communication networks, in particular of the type discussed herein, e.g. 5G, 4G/LTE, 3G and similar, where charging functionality is known to be present in the core network. More generally, as used herein, charging in relation to a wireless device may be described as keeping track of, e.g. by measuring and/or estimating, such as according to some predetermined or predefined relation or function, a cost and/or liability for payment associated with the wireless device or user thereof.

The present action may fully or partly correspond to any one of Actions 207, 305, 405 discussed above.

Figure 8:
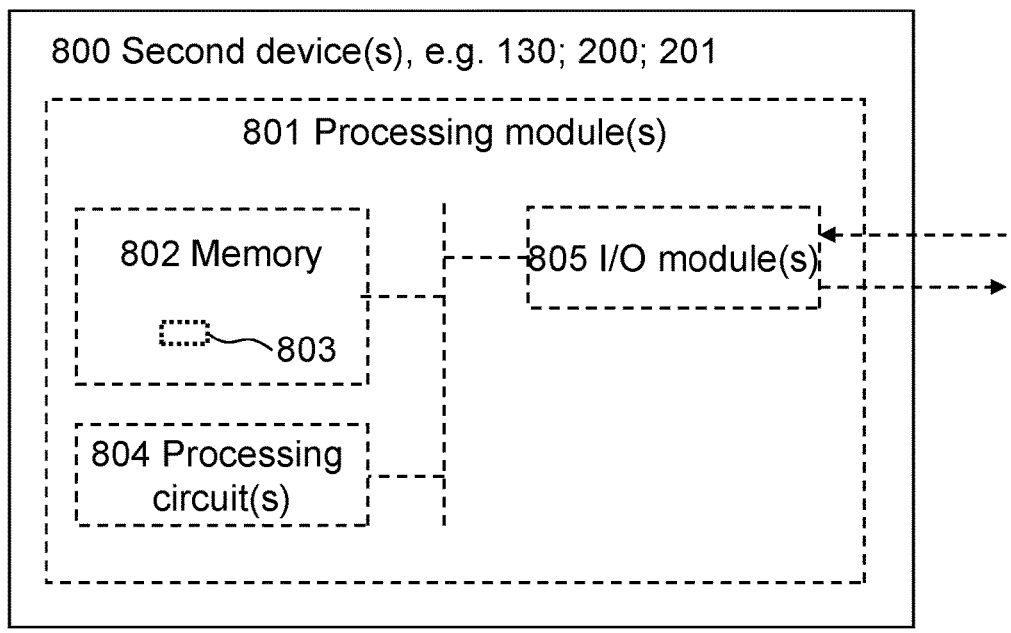
FIG. 8 is a functional block diagram for illustrating embodiments of second device(s) and it can be configured to carry out the second method.

FIG. 8 is a schematic block diagram for illustrating embodiments of one or more second devices 800. The schematic block diagram is also used for illustrating embodiments of how the second device(s) 800 may be configured to perform the second method and actions thereof as discussed above in relation to FIG. 7.

Hence, the second device(s) 800 is for supporting charging relating to a group transmission in a wireless communication network, e.g. the wireless communication network 100. The group transmission involves a group, e.g. the group 125, of wireless devices, e.g. 120*a-c*, configured to, via one or more direct communication links, e.g. side links 122*ab*, 122*ac*, 122*bc*, between each other, participate in transmission of user data between a source wireless device, e.g. 120*a*, and the wireless communication network 100. There may be an assisting wireless device in the group 125, e.g. 120*b* and a coordinating wireless device, e.g. 120*c*, i.e. similar as above.

The second device(s) may e.g. comprise or be the core network node(s) 120, the further node 201 and/or the further network 200.

The second device(s) 800 may comprise processing module(s) 801, such as a means, one or more hardware modules, including e.g. one or more processors, and/or one or more software modules for performing said method and/or actions.

The second device(s) 800 may further comprise memory 802 that may comprise, such as contain or store, a computer program 803. The computer program 803 comprises 'instructions' or 'code' directly or indirectly executable by the second device(s) 800 to perform said method and/or actions. The memory 802 may comprise one or more memory units and may further be arranged to store data, such as configurations and/or applications involved in or for performing functions and actions of embodiments herein.

Moreover, the second device(s) 800 may comprise processing circuit(s) 804 as exemplifying hardware module(s) and may comprise or correspond to one or more processors. In some embodiments, the processing module(s) 801 may comprise, e.g. 'be embodied in the form of' or 'realized by' the processing circuit(s) 804. In these embodiments, the memory 802 may comprise the computer program 803 executable by the processing circuit(s) 804, whereby the second device(s) 800 is operative, or configured, to perform said method and/or actions thereof.

Typically, the second device(s) 800, e.g. the processing module(s) 801, comprises Input/Output (I/O) module(s) 805, configured to be involved in, e.g. by performing, any communication to and/or from other units and/or nodes, such as sending and/or receiving information to and/or from other nodes or devices. The I/O module(s) 805 may be exemplified by obtaining, e.g. receiving, module(s) and/or providing, e.g. sending, module(s), when applicable.

Further, in some embodiments, the second device(s) 800, e.g. the processing module(s) 801, comprises one or more of initiating module(s), obtaining module(s) and charging module(s), as exemplifying hardware and/or software module(s). These modules may be fully or partly implemented by the processing circuit(s) 804.

Hence:

The second device(s) 800, and/or the processing module(s) 801, and/or the processing circuit(s) 804, and/or the I/O module(s) 805, the initiating module(s) and/or the obtaining module(s) may be operative, or configured, to initiate to obtain, by said one or more core network nodes, e.g. 130, of the wireless communication network 100, said one or more reports based on said data amount indicators indicating how much data the individual wireless devices, e.g. 120*a-c*, have been involved in transmitting as part of the group transmission.

Further, the second device(s) 800, and/or the processing module(s) 801, and/or the processing circuit(s) 804, and/or the I/O module(s) 805, the initiating module(s) and/or the charging module(s) may be operative, or configured, to initiate to charge wireless communication devices, e.g. 120*a-c*, of the group 125 based on the obtained one or more reports.

In some embodiments, the second device(s) 800, and/or the processing module(s) 801, and/or the processing circuit(s) 804, and/or the I/O module(s) 805, the initiating module(s) and/or the obtaining module(s) may be operative, or configured, to obtain at least one of the reports by receiving it from a radio network node, e.g. 110, comprised in the wireless communication network 100 and configured to serve one or more of the wireless devices, e.g. 120*a-c*, of the group 125.

In some embodiments, the second device(s) 800, and/or the processing module(s) 801, and/or the processing circuit(s) 804, and/or the I/O module(s) 805, the initiating module(s) and/or the obtaining module(s) may be operative, or configured, to obtain at least one of the reports by receiving it from one or more wireless devices, e.g. 120*a-c*, of the group 125.

Figure 9:
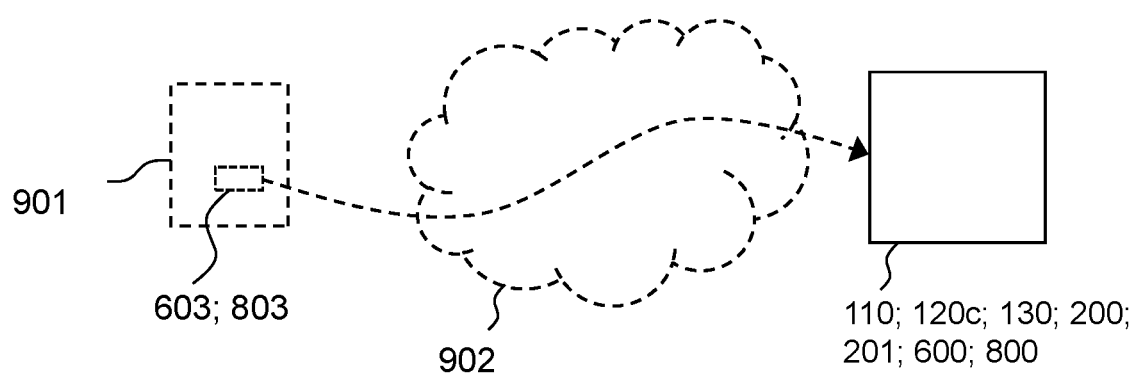
FIG. 9 is a schematic drawing illustrating some embodiments relating to computer programs and carriers thereof.

FIG. 9 is a schematic drawing illustrating some embodiments relating to computer program(s) and carrier(s) thereof to cause said first device(s) 600 and/or second device(s) discussed above to perform the associated methods and actions, respectively. The computer program(s) may be the computer program 603 and/or 703 and comprises instructions that when executed by the processing circuit(s) 604 and/or 804 and/or the processing module(s) 601 and/or 801, causes the respective device(s) 600, 800 to perform as described above. In some embodiments there is provided a carrier, or more specifically a data carrier, e.g. a computer program product, comprising the computer program. The carrier may be one of an electronic signal, an optical signal, a radio signal, and a computer readable storage medium, e.g. a computer readable storage medium 901 as schematically illustrated in the figure. One or more of the computer programs 603, 803 may thus be stored on the computer readable storage medium 901. By carrier may be excluded a transitory, propagating signal and the data carrier may correspondingly be named non-transitory data carrier. Non-limiting examples of the data carrier being a computer readable storage medium is a memory card or a memory stick, a disc storage medium such as a CD or DVD, or a mass storage device that typically is based on hard drive(s) or Solid State Drive(s) (SSD). The computer readable storage medium 901 may be used for storing data accessible over a computer network 902, e.g. the Internet or a Local Area Network (LAN). One or more of the computer programs 603, 803 may furthermore be provided as pure computer program(s) or comprised in a file or files. The file or files may be stored on the computer readable storage medium 901 and e.g. available through download e.g. over the computer network 902 as indicated in the figure, e.g. via a server. The server may e.g. be a web or File Transfer Protocol (FTP) server. The file or files may e.g. be executable files for direct or indirect download to and execution on said first node to make it perform as described above, e.g. by execution by the processing circuit(s) 604 and/or 804. The file or files may also or alternatively be for intermediate download and compilation involving the same or another processor to make them executable before further download and execution causing said first device(s) 600 and/or second device(s) 800 to perform as described above.

Note that any processing module(s) and circuit(s) mentioned in the foregoing may be implemented as a software and/or hardware module, e.g. in existing hardware and/or as an Application Specific Integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the node(s) and device(s) to be configured to and/or to perform the above-described methods and actions.

Identification by any identifier herein may be implicit or explicit. The identification may be unique in a certain context, e.g. in the wireless communication network or at least in a relevant part or area thereof.

The term "network node" or simply "node" as used herein may as such refer to any type of node. e.g. in the form of a device, that may communicate with another node in and be comprised in a communication network, e.g. Internet Protocol (IP) network and/or wireless communication network. Further, such node may be or be comprised in a radio network node (e.g. as described below) or any network node, which e.g. may communicate with a radio network node. Examples of such network nodes include any radio network node, a core network node, Operations & Maintenance (O&M), Operations Support Systems (OSS), Self Organizing Network (SON) node, etc.

The term "radio network node" as may be used herein may as such refer to any type of network node for serving a wireless communication device, e.g. a so called User Equipment or UE, and/or that are connected to other network node(s) or network element(s) or any radio node from which a wireless communication device receives signals from. Examples of radio network nodes are Node B, Base Station (BS), Multi-Standard Radio (MSR) node such as MSR BS, eNB, eNodeB, gNB, network controller, RNC, Base Station Controller (BSC), relay, donor node controlling relay, Base Transceiver Station (BTS), Access Point (AP), New Radio (NR) node, transmission point, transmission node, node in distributed antenna system (DAS) etc.

Each of the terms "wireless device", "user equipment" and "UE", as may be used herein, may as such refer to any type of wireless communication device arranged to communicate with a radio network node in a wireless, cellular and/or mobile communication system, and may thus be referred to as a wireless communication device or simply wireless device. Examples include: target devices, device to device UE, device for Machine Type of Communication (MTC), machine type UE or UE capable of machine to machine (M2M) communication, Personal Digital Assistant (PDA), iPAD, Tablet, mobile, terminals, smart phone, Laptop Embedded Equipment (LEE), Laptop Mounted Equipment (LME), Universal Serial Bus (USB) dongles etc.

While some terms are used frequently herein for convenience, or in the context of examples involving other a certain, e.g. 3GPP or other standard related, nomenclature, it must be appreciated that such term as such is non-limiting Also note that although terminology used herein may be particularly associated with and/or exemplified by certain communication systems or networks, this should as such not be seen as limiting the scope of the embodiments herein to only such certain systems or networks etc.

As used herein, the term "memory" may refer to a data memory for storing digital information, typically a hard disk, a magnetic storage, medium, a portable computer diskette or disc, flash memory, Random Access Memory (RAM) or the like. Furthermore, the memory may be an internal register memory of a processor.

Also note that any enumerating terminology such as first node, second node, first device, second device, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of unicasting, one specifically addressed device may receive and encode the transmission. In case of group-casting, e.g. multicasting, a group of specifically addressed devices may receive and decode the transmission.

When using the word "comprise" or "comprising" it shall be interpreted as nonlimiting, i.e. meaning "consist at least of".

The embodiments herein are not limited to the above described embodiments. Various alternatives, modifications and equivalents may be used. Therefore, the above embodiments should not be taken as limiting the scope of the present disclosure, which is defined by the appending claims.

The invention claimed is:

1. A method, performed by a device, for supporting charging relating to a group transmission in a wireless communication network, said group transmission involving a group of wireless devices configured to, via one or more direct communication links between each other, participate in transmission of user data between a source wireless device and the wireless communication network, the method comprising:
   obtaining, for each one of wireless devices of the group, a data amount indicator indicating how much data the wireless device has been involved in transmitting as part of the group transmission; and
   providing one or more reports based on the obtained data amount indicators to one or more core network nodes of the wireless communication network, which one or more core network nodes are involved in charging of wireless devices served by the wireless communication network;
   at least one of the one or more reports relating to a wireless communication device of the group that assisted with the group transmission and comprising one or more of the following: information on data amount that the wireless communication device has assisted with as part of the group transmission, an identifier identifying the source wireless device, and an identifier identifying the wireless communication device itself; and
   the information on data amount that the wireless communication device has assisted with as part of the group transmission comprising a scaling factor that indicates a level at which the wireless communication device has assisted in the group transmission and at least one of the information on data amount and scaling factor comprising the data amount indicator obtained for the wireless device.

2. The method as claimed in claim 1, wherein said one or more reports separate reporting relating to the source wireless device from reporting relating to one or more other wireless devices of the group that assist with the group transmission.

3. The method as claimed in claim 1, wherein at least one of said one or more reports relates to the source wireless device and comprises one or more of the following: information on data amount transmitted for the source wireless device as part of the group transmission, an identifier identifying the group, an identifier identifying the source wireless device, information specifying duration of the group transmission, and one or more identifiers for identifying services relating the group transmission.

4. The method as claimed in claim 1, wherein said device is a radio network node comprised in the wireless communication network and configured to serve one or more of the wireless devices of the group.

5. The method as claimed in claim 1, wherein said device is a coordinating wireless device being a wireless communication device of the group assigned to act as a coordinator for the group regarding at least the group transmission.

6. A method, performed by a device, for supporting charging relating to a group transmission in a wireless communication network, said group transmission involving a group of wireless devices configured to, via one or more direct communication links between each other, participate in transmission of user data between a source wireless device and the wireless communication network, the method comprising:
  obtaining, for one or more core network nodes of the wireless communication network, one or more reports based on data amount indicators indicating how much data individual wireless devices have been involved in transmitting as part of the group transmission, which one or more core network nodes are involved in charging of wireless communication devices served by the wireless communication network;
  at least one of the one or more reports relating to a wireless communication device of the group that assisted with the group transmission and comprising one or more of the following: information on data amount that the wireless communication device has assisted with as part of the group transmission, an identifier identifying the source wireless device, and an identifier identifying the wireless communication device itself; and
  the information on data amount that the wireless communication device has assisted with as part of the group transmission comprising a scaling factor that indicates a level at which the wireless communication device has assisted in the group transmission and at least one of the information on data amount and scaling factor comprising the data amount indicator obtained for the wireless device.

7. The method as claimed in claim 6, wherein the method further comprising:
  charging wireless communication devices of the group based on the obtained one or more reports.

8. The method as claimed in claim 6, wherein the charging is further based on a predetermined charging policy that separates charging relating to the source wireless device from charging relating to the other one or more wireless devices of the group.

9. The method as claimed in claim 6, wherein the charging is further based on rewarding one or more of the wireless communication devices of the group that have assisted in the group transmission.

10. The method as claimed in claim 6, wherein said device is one of said one or more core network nodes that are obtaining at least one of the reports by receiving it from a radio network node comprised in the wireless communication network and configured to serve one or more of the wireless devices of the group.

11. The method as claimed in claim 6, wherein said device is one of said one or more core network nodes that are obtaining at least one of the reports by receiving it from one or more wireless devices of the group.

12. The method as claimed in claim 6, wherein said one or more reports separate reporting relating to the source wireless device from reporting relating to one or more other wireless devices of the group that assist with the group transmission.

13. The method as claimed in claim 6, wherein at least one of said one or more reports relates to the source wireless device and comprises one or more of the following: information on data amount transmitted for the source wireless device as part of the group transmission, an identifier identifying the group, an identifier identifying the source wireless device, information specifying duration of the group transmission, and one or more identifiers for identifying services relating the group transmission.

14. A device for supporting charging relating to a group transmission in a wireless communication network, said group transmission involving a group of wireless devices configured to, via one or more direct communication links between each other, participate in transmission of user data between a source wireless device and the wireless communication network, wherein said device comprising:
  one or more processors; and
  a memory comprising instructions which, when executed by the one or more processors cause the device to:
    for each one of wireless devices of the group, a data amount indicator indicating how much data the wireless device has been involved in transmitting as part of the group transmission; and
    provide one or more reports based on the obtained data amount indicators to one or more core network nodes of the wireless communication network, which one or more core network nodes are involved in charging of wireless devices served by the wireless communication network;
  at least one of the one or more reports relating to a wireless communication device of the group that assisted with the group transmission and comprising one or more of the following: information on data amount that the wireless communication device has assisted with as part of the group transmission, an identifier identifying the source wireless device, and an identifier identifying the wireless communication device itself; and
  the information on data amount that the wireless communication device has assisted with as part of the group transmission comprising a scaling factor that indicates a level at which the wireless communication device has assisted in the group transmission and at least one of the information on data amount and scaling factor comprising the data amount indicator obtained for the wireless device.

15. A device for supporting charging relating to a group transmission in a wireless communication network, said group transmission involving a group of wireless devices to, via one or more direct communication links between each other, participate in transmission of user data between a source wireless device and the wireless communication network, wherein said device comprising:
  one or more processors; and
  a memory comprising instructions which, when executed by the one or more processors cause the device to:
    obtain for one or more core network nodes of the wireless communication network, one or more reports based on data amount indicators indicating how much data individual wireless devices have been involved in transmitting as part of the group transmission, which one or more core network nodes are involved in charging of wireless communication devices served by the wireless communication network;

at least one of the one or more reports relating to a wireless communication device of the group that assisted with the group transmission and comprising one or more of the following: information on data amount that the wireless communication device has assisted with as part of the group transmission, an identifier identifying the source wireless device, and an identifier identifying the wireless communication device itself; and the information on data amount that the wireless communication device has assisted with as part of the group transmission comprising a scaling factor that indicates a level at which the wireless communication device has assisted in the group transmission and at least one of the information on data amount and scaling factor comprising the data amount indicator obtained for the wireless device.

* * * * *